US012695476B2

(12) United States Patent
Li

(10) Patent No.: US 12,695,476 B2
(45) Date of Patent: Jul. 28, 2026

(54) ARBITRARY SIGNAL GENERATION AND ACQUISITION DEVICE WITH MULTI-CHANNEL SHARED BANDWIDTH

(71) Applicant: Macrotest Semiconductor Technology Co., Ltd, Nanjing (CN)

(72) Inventor: Quanren Li, Nanjing (CN)

(73) Assignee: Macrotest Semiconductor Technology Co., Ltd, Nanjing (CN)

( * ) Notice: Subject to any disclaimer, the term of this patent is extended or adjusted under 35 U.S.C. 154(b) by 92 days.

(21) Appl. No.: 18/687,307

(22) PCT Filed: Mar. 15, 2023

(86) PCT No.: PCT/CN2023/081505
§ 371 (c)(1),
(2) Date: Feb. 28, 2024

(87) PCT Pub. No.: WO2023/226543
PCT Pub. Date: Nov. 30, 2023

(65) Prior Publication Data
US 2025/0080152 A1      Mar. 6, 2025

(30) Foreign Application Priority Data

May 25, 2022    (CN) .......................... 202210573263.6

(51) Int. Cl.
*H04B 1/40* (2015.01)
(52) U.S. Cl.
CPC ...................................... *H04B 1/40* (2013.01)
(58) Field of Classification Search
None
See application file for complete search history.

(56) References Cited

U.S. PATENT DOCUMENTS 6,469,957 B1    10/2002  Savord et al.
11,128,390 B1 *  9/2021  Rajmohan ............ H04B 17/295
(Continued)

FOREIGN PATENT DOCUMENTS

CN        102638263 A      8/2012
CN        104198918 A     12/2014
(Continued)

OTHER PUBLICATIONS

International search report of PCT/CN2023/081505.

*Primary Examiner* — Diane L Lo
(74) *Attorney, Agent, or Firm* — Hemisphere Law, PLLC

(57)          ABSTRACT

The present disclosure discloses an arbitrary signal generation and acquisition device with a multi-channel shared bandwidth, including a synchronous data generator, a first direct digital synthesis (DDS) configurator, a second DDS configurator, first DDS generator, a second DDS generator, a digital-analog (DA) and multiplexer (MUX) controller, an analog-digital (AD) controller, a low-speed AD, a high-speed DA, an 8-to-1 multiplexer, a 1-to-8 multiplexer, an arbitrary waveform generator (AWG) channel, a digitalizer (DIG) channel, a data storage and data signal processor (DSP), a 2-to-1 multiplexer, and a VREF reference voltage generator group. The present disclosure reduces the high DAC cost required for achieving high-speed and high-precision AWG, multiplexes a low-speed and high-precision DIG channel to achieve high-speed acquisition, and improves the integration of a test system of auto test equipment (ATE).

2 Claims, 2 Drawing Sheets

(56)                    References Cited

U.S. PATENT DOCUMENTS

2010/0251045  A1*   9/2010  Hapke ............ G01R 31/318552
                                                                    714/724
2016/0146888  A1    5/2016  Vooka et al.
2020/0033405  A1    1/2020  Chan et al.

FOREIGN PATENT DOCUMENTS

CN          111490772  A     8/2020
CN          111506153  Y     8/2020
CN          112367082  A     2/2021
CN          214225341  Y     9/2021
CN          114089040  A     2/2022
CN          114461472  A     5/2022
CN        114660979 PX       6/2022

* cited by examiner

ARBITRARY SIGNAL GENERATION AND ACQUISITION DEVICE WITH MULTI-CHANNEL SHARED BANDWIDTH

TECHNICAL FIELD

The present disclosure relates to an arbitrary signal generation and acquisition device with a multi-channel shared bandwidth, and belongs to the technical field of automatic test of an integrated circuit.

BACKGROUND

In order to meet the increasing demands of modern electronic equipment for external perception and interaction, more and more analog and mixed signal functions have been integrated into a modern integrated circuit. For example, a typical system on chip (SOC) circuit will be integrated with one audio output, one video output, and four low-speed AD inputs. How to complete a test on such chips more efficiently and at a lower cost on Automatic Test Equipment (ATE) also constantly faces challenges.

According to a traditional solution, a high-frequency and high-bandwidth Mixed Signal Test Board (MSTB) can be arranged on the ATE to achieve an Arbitrary Wave Generator (AWG) and a Digitizer (DIG), so as to test video signals, intermediate-frequency signals, baseband signals, or the like. In addition, a low-frequency mixed signal test board is provided to test audios, low-speed AD, and the like. Since the high-frequency board has high cost, one board can provide fewer channels, so it is necessary to combine a low-frequency board to achieve tests with higher cost performance and more parallel test sites.

This method has several problems. Firstly, the high-speed mixed signal board and the low-speed mixed signal board respectively occupy bus slots of the ATE respectively, which reduces the utilization rate of the bus slots of the ATE. Secondly, the cost of the high-frequency board is too high (because sampling rate and a bandwidth indicator of AD/DA used are relatively high), resulting in high test cost. Thirdly, due to a limited number of high-frequency test channels on a device under test (DUT) end, it is necessary to switch a high-frequency channel to test pins of various sites through a relay during multi-site testing. As a result, the test efficiency is reduced, and the test difficulty is increased.

SUMMARY

Objectives of this invention: In order to overcome the shortcomings in the prior art, the present disclosure provides an arbitrary signal generation and acquisition device with a multi-channel shared bandwidth. In order to achieve an AWG and a DIZ with a high sampling rate and high accuracy and reduce the overall development cost, the following several problems need to be solved: 1: How to multiplex a high-speed medium-precision digital-to-analog converter (DAC) to achieve a high-speed and high-precision AWG. 2: How to multiplex a low-speed high-precision analog-to-digital converter (ADC) to achieve a high-speed and high-precision DIG. 3: How to allocate in-board resources reasonably to reduce the cost of boards. Through a method for AD/DA multiplexing and combination on a signal channel, the present disclosure achieves coexistence of two types DIG modes: a low-speed and high-precision mode and a high-speed and high-precision mode, and coexistence of two AWG modes: a high-speed and low-precision mode and a high-speed and high-precision mode. The first advantage of this method is reducing the occupation of bus slots. Only one slot can achieve a high-speed and low-speed channel test functions. The second advantage of this method is reducing the test cost. As DAC/ADC required by the high-precision AWG/DIG is very expensive. This method combines adjacent high-speed and medium-precision DACs to achieve a high-precision channel in the high-speed and high-precision DAC mode. Similarly, a high-speed DIG module achieves high-speed acquisition through staggered sampling by a plurality of ADCs. The third advantage is lowering a periphery test requirement of a device under test (DUT). Due to the sharing of high-speed channels and low-speed channels, input and output signals of the DUT do not need to be switched to automatic test equipment (ATE) through an external relay and other components for testing, which simplifies the test requirement of the DUT.

Technical solutions: In order to achieve the above objectives, the present disclosure adopts the following technical solutions:

An arbitrary signal generation and acquisition device with a multi-channel shared bandwidth includes a synchronous data generator, a first direct digital synthesis (DDS) configurator, a second DDS configurator, first DDS generator, a second DDS generator, a digital-analog (DA) and multiplexer (MUX) controller, an analog-digital (AD) controller, a low-speed AD, a high-speed DA, an 8-to-1 multiplexer, a 1-to-8 multiplexer, an arbitrary waveform generator (AWG) channel, a digitalizer (DIG) channel, a data storage and data signal processor (DSP), a 2-to-1 multiplexer, and a VREF reference voltage generator group, wherein the synchronous data generator, the first DDS configurator, the first DDS generator, the DA and MUX controller are connected in sequence, and the synchronous data generator is connected to the DA and MUX controller; the data storage and DSP, the second DDS configurator, the second DDS generator, and the AD controller are connected in sequence; the AD controller is connected to the data storage and DSP; the low-speed AD is connected to the AD controller; the high-speed DA is connected to the DA and MUX controller;

an inlet end of the 8-to-1 multiplexer is connected to an outlet end of the DIG channel, and an outlet end of the 8-to-1 multiplexer is connected to the low-speed AD;

an inlet end of the 2-to-1 multiplexer is connected to the high-speed DA; an outlet end of the 2-to-1 multiplexer is connected to an inlet end of the 1-to-8 multiplexer; an outlet end of the 1-to-8 multiplexer is connected to an inlet end of the AWG channel; and the VREF reference voltage generator group is respectively connected to the first DDS configurator and the high-speed DA.

Preferably, the DIG channel includes a DIG channel fanout apparatus, a DIG channel filtering shifter, and a DIG channel input buffer; and the inlet end of the 8-to-1 multiplexer is respectively connected to outlet ends of the DIG channel fanout apparatus, the DIG channel filtering shifter, and the DIG channel input buffer. The AWG channel includes an adder, an AWG channel filtering shifter, and an AWG channel output buffer; and an outlet end of the 1-to-8 multiplexer is connected to inlet ends of the adder, the AWG channel filtering shifter, and the AWG channel output buffer.

Preferably, the synchronous data generator is configured to generate DA data synchronized with DDS. The first DDS generator is configured to generate a sampling frequency of AD/DA.

Preferably, the first DDS configurator is configured to set a reference voltage setting configured for DAs in the first DDS generator and the VREF reference voltage generator group in which the DAs need to be synchronized; or to set DDS generator configurations of a plurality of ADs that require staggered sampling.

Preferably, the DA and MUX controller is configured to send DA data to the DAs according to a DA triggering signal provided by a DDS, and send a DA conversion start signal; or, the 2-to-1 multiplexer is controlled to select a DA signal or a level 0 according to a MUX triggering signal provided by the DDS, and the MUX triggering signal is sent to a specified channel.

Preferably, the data storage and DSP is configured to synchronously obtain an AD conversion result from the AD controller according to a DDS synchronization signal, store the AD conversion result in a memory, and integrate multi-channel data in real time through the DSP.

Preferably, the AD controller is configured to send an AD conversion start signal according to the AD triggering signal provided by the DDS, read the AD conversion result, and hand the AD conversion result over to the data storage and DSP.

Preferably, the 8-to-1 multiplexer is configured to select one signal from DIZ input signals of at most eight channels and hand the signal over to the low-speed AD or conversion.

Preferably, the 2-to-1 multiplexer is configured to select an output of the DA or an output of the level 0 to the 1-to-8 multiplexer in the subsequent stage according to a MUX triggering signal of the DDS provided by the DA and MUX controller; and Preferably, the 1-to-8 multiplexer is configured to switch the output of the 2-to-1 multiplexer in the previous stage to one of the 8 channels as required, and output the same to the AWG channel at a front end.

Compared with the prior art, the present disclosure has the following technical effects:

1. The high DAC cost for achieving a high-speed and high-precision AWG is reduced, and multiplexing of low-speed and high-precision DIG channels achieves high-speed acquisition, making it more cost-effective.

2. Multiplexing of various AWGs and DIGs can be configured through software, without changing hardware output interfaces, so that it is convenient for a user to test product development and compatibility with a universal DUT card.

3. More system spaces are saved, and other functional boards can be configured, which improves the integration of a test system of the ATE.

DETAILED DESCRIPTION OF THE EMBODIMENTS

Based on the accompanying drawings and specific embodiments, the present disclosure will be further elaborated. It should be understood that these examples are only used to illustrate the present disclosure and not to limit the scope of the present disclosure. After reading the present disclosure, modifications to various equivalent forms of the present disclosure by those skilled in the art shall all fall within the scope defined by the claims attached to the present disclosure.

Figure 1:
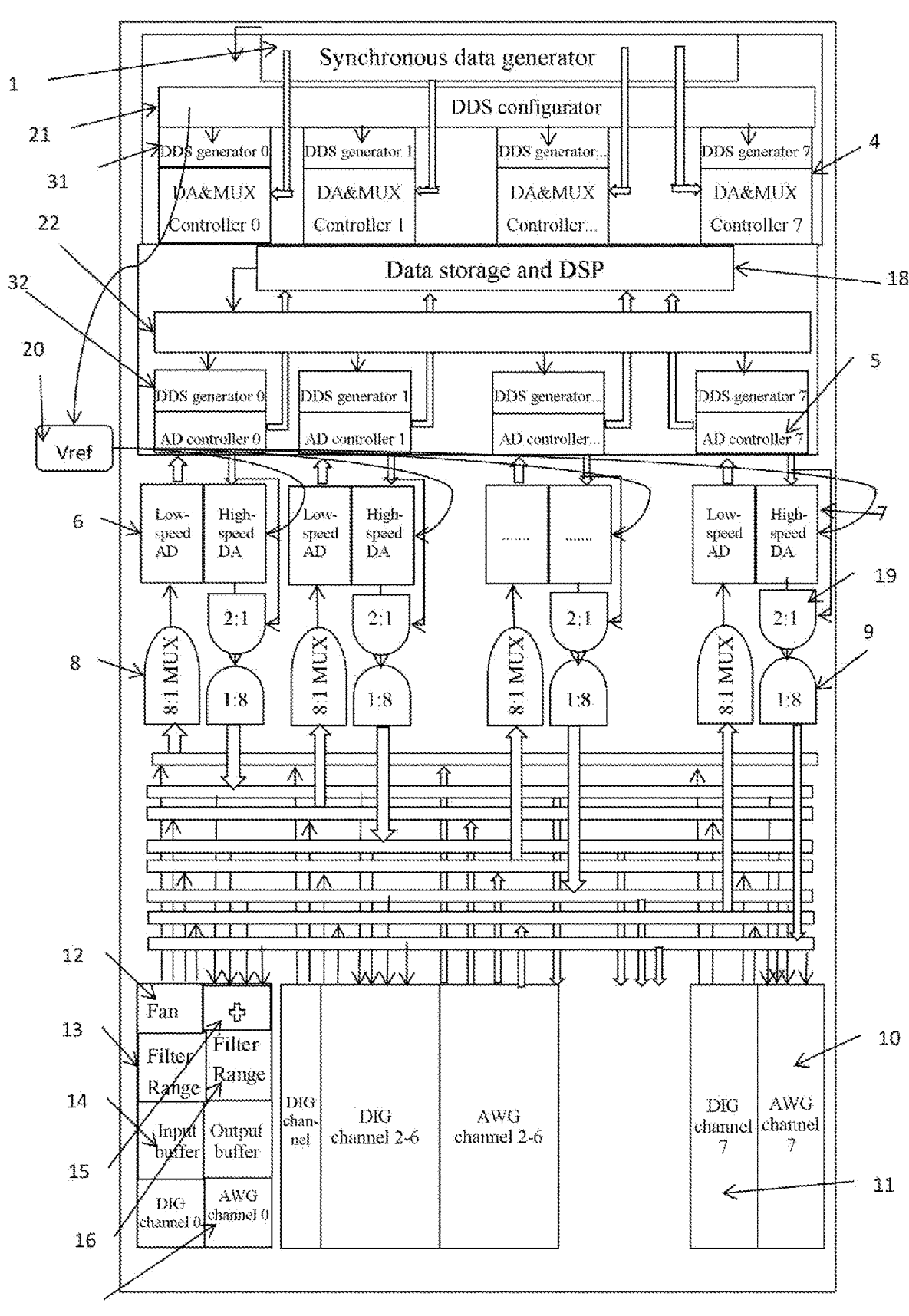
FIG. 1 is a schematic diagram of an arbitrary signal generation and acquisition device with a multi-channel shared bandwidth according to the present disclosure.

An arbitrary signal generation and acquisition device with a multi-channel shared bandwidth, as shown in FIG. 1, includes a synchronous data generator 1, a first DDS configurator 21, a second DDS configurator 22, first DDS generator 31, a second DDS generator 32, a DA and MUX controller 4, an AD controller 5, a low-speed AD 6, a high-speed DA 7, an 8-to-1 multiplexer 8, a 1-to-8 multiplexer 9, an AWG channel 10, a DIG channel 11, a data storage and DSP 18, a 2-to-1 multiplexer 19, and a VREF reference voltage generator group 20, wherein the synchronous data generator 1, the first DDS configurator 21, the first DDS generator 31, the DA and MUX controller 4 are connected in sequence, and the synchronous data generator 1 is connected to the DA and MUX controller 4; the data storage and DSP 18, the second DDS configurator 22, the second DDS generator 32, and the AD controller 5 are connected in sequence; the AD controller 5 is connected to the data storage and DSP 18; the low-speed AD 6 is connected to the AD controller 5, and the high-speed DA 7 is connected to the DA and MUX controller 4;

an inlet end of the 8-to-1 multiplexer 8 is connected to an outlet end of the DIG channel 11, and an outlet end of the 8-to-1 multiplexer 8 is connected to the low-speed AD 6;

an inlet end of the 2-to-1 multiplexer 19 is connected to the high-speed DA 7; an outlet end of the 2-to-1 multiplexer 19 is connected to an inlet end of the 1-to-8 multiplexer 9;

an outlet end of the 1-to-8 multiplexer 9 is connected to an inlet end of the AWG channel 10;

the VREF reference voltage generator group 20 is respectively connected to the first DDS configurator 21 and the high-speed DA 7;

the DIG channel 11 includes a DIG channel fanout apparatus 12, a DIG channel filtering shifter 13, and a DIG channel input buffer 14; and the inlet end of the 8-to-1 multiplexer 8 is respectively connected to outlet ends of the DIG channel fanout apparatus 12, the DIG channel filtering shifter 13, and the DIG channel input buffer 14. The AWG channel 10 includes an adder 15, an AWG channel filtering shifter 16, and an AWG channel output buffer 17; and an outlet end of the 1-to-8 multiplexer 9 is connected to inlet ends of the adder 15, the AWG channel filtering shifter 16, and the AWG channel output buffer 17.

The synchronous data generator 1 is configured to generate DA data synchronized with DDS.

The first DDS configurator is configured to set a reference voltage setting configured for DAs in the first DDS generator and the VREF reference voltage generator group in which the DAs need to be synchronized, so as to combine the plurality of DAs for use; or to set DDS generator configurations of a plurality of ADs that require staggered sampling. The first DDS configurator 21 and the first DDS generator 31 are provided for use by an AWG module. An originally provided image is a green data stream to achieve an arbitrary frequency waveform of the AWG. The second DDS configurator 22 and the second DDS generator 32 are provided for use by a DIG. An original block diagram shows a blue data stream to achieve an arbitrary sampling frequency of the DIG.

The VREF reference voltage generator group 20 provides a plurality of groups of reference voltages in multiple relationships, and provides the reference voltages to the DAs of various channels according to the first DDS configurator 21.

The first DDS generator 31 is configured to generate a sampling frequency of AD/DA. The first DDS generator 31 includes a DDS generator 0, a DDS generator I, a DDS generator II, a DDS generator III, a DDS generator IV, a DDS generator V, a DDS generator VI, and a DDS generator VII. The second DDS generator 32 includes a DDS generator 0, a DDS generator I, a DDS generator II, a DDS generator III, a DDS generator IV, a DDS generator V, a DDS generator VI, and a DDS generator VII.

The DA and MUX controller 4 is configured to send DA data to the DAs according to a DA triggering signal provided by a DDS, and send a DA conversion start signal. Or, the 2-to-1 multiplexer 19 is controlled to select a DA signal or a level 0 (signal ground) according to a MUX triggering signal provided by the DDS, and the MUX triggering signal is sent to a specified channel. The DA and MUX controller 4 includes a DA and MUX controller 0, a DA and MUX controller I, a DA and MUX controller II, a DA and MUX controller III, a DA and MUX controller IV, a DA and MUX controller V, a DA and MUX controller VI, and a DA and MUX controller VII.

The AD controller 5 is configured to send an AD conversion start signal according to the AD triggering signal provided by the DDS, read the AD conversion result, and hand the AD conversion result over to the data storage and DSP 18. The AD controller 5 includes an AD controller 0, an AD controller I, an AD controller II, an AD controller III, an AD controller IV, an AD controller V, an AD controller VI, and an AD controller VII.

The low-speed AD 6 is configured to complete analog-to-digital conversion of a signal under test transmitted by a DIZ channel of the DIG channel 11 of the front end according to a control signal of the AD controller 5.

The high-speed DA 7 is configured to complete digital to analog level conversion according to a control signal of the DA and MUX controller 4, and output a level signal to the AWG channel 10 of the front end.

The 8-to-1 multiplexer 8 is configured to select one signal from DIZ input signals of at most eight channels and hand the signal over to the low-speed AD 6 for conversion.

The 1-to-8 multiplexer 9 is configured to switch the output of the 2-to-1 multiplexer 19 in the previous stage to one of the 8 channels as required, and output the same to the AWG channel of the front end.

The AWG channel 10 includes three parts: an adder 15, an AWG channel filtering shifter 16, and an AWG channel output buffer 17, and is configured to superpose output analog levels of the plurality of DAs, filter and amplify the output analog levels, and output the analog levels to an external DUT. The AWG channel 10 includes eight channels: an AWG channel 0, an AWG channel I, an AWG channel II, an AWG channel III, an AWG channel IV, an AWG channel V, an AWG channel VI, and an AWG channel VII.

The adder 15 is configured to superpose inputs of the plurality of previous DAs and output the inputs to the later stage for filtering.

The AWG channel filtering shifter 16 is configured to perform different low-pass filtering according to a frequency range of an output waveform.

The AWG channel output buffer 17 is configured to amplify a filtered waveform and output the waveform to the DUT.

The DIG channel 11 includes three parts: a DIG channel fanout apparatus 12, a DIG channel filtering shifter 13, and a DIG channel input buffer 14, and is configured to amplify and filter an input signal of the external DUT, and then fan out the input signal to the plurality of AD channels at an equal length. The DIG channel 11 includes eight channels: a DIG channel 0, a DIG channel I, a DIG channel II, a DIG channel III, a DIG channel IV, a DIG channel V, a DIG channel VI, and a DIG channel VII.

The DIG channel input buffer 14 is configured to amplify or reduce an external analog input signal to meet a level requirement of internal processing.

The DIG channel filtering shifter 13 is configured o perform different low-pass filterings according to a frequency range of the external analog input signal.

The DIG channel fanout apparatus 12 is configured to copy the filtered analog signal at an equal length and output the analog signal to the plurality of AD channels.

Implementation steps for the AWG are as follows:

When the maximum conversion frequency of DA of a high-speed AWG channel is 200 MHz, the resolution of DA is 14 bits. When a reference voltage VREF is 5 V, the least significant bit (LSB) is $5/2^{14}=0.30517578125$ mV. If a waveform with a higher resolution needs to occur, for example, if a waveform with an 18-bit resolution occurs on channel 0, it is set that the DA of channel 0 adopts a 5V reference voltage. The high 14 bits of 18-bit data are sent to the DA of channel 0. It is set that the DA of channel 1 adopts a 1.25V reference voltage. The low 4 bits of the 18-bit data are calculated and sent to the DA of channel 1. Output values of the DAs of the two channels are added to output high-speed 18-bit resolution data.

Implementation Steps of the DIG are as Follows:

When the maximum conversion frequency of AD of a low-speed DIG channel is 5 MHz, a single channel can achieve a maximum sampling rate of 5 MHz. If it is desired to sample a waveform input by channel 0 at 25 MHz through multi-channel sharing, for bandwidth sharing of a multi-channel DIG, DDSs of five DIG channel are set, so that the various DDSs generate periodic signals with a frequency of 5 MHz and a phase difference of 200 ns/5=40 ns according to requirements for a target frequency and a sampling rate. The ADs of the various channels are started to be converted according to this chronological order. Then, it is set that #8 (8:1MUX) of each AD channel is connected to a Fan Out output of #12 of the DIG of channel 0.

The data storage and DSP 18 synchronously acquires and stores the outputs of the various ADs, then arranges and restores data of the various ADs in order, and analyzes and calculates sampling data through a DSP.

Figure 2:
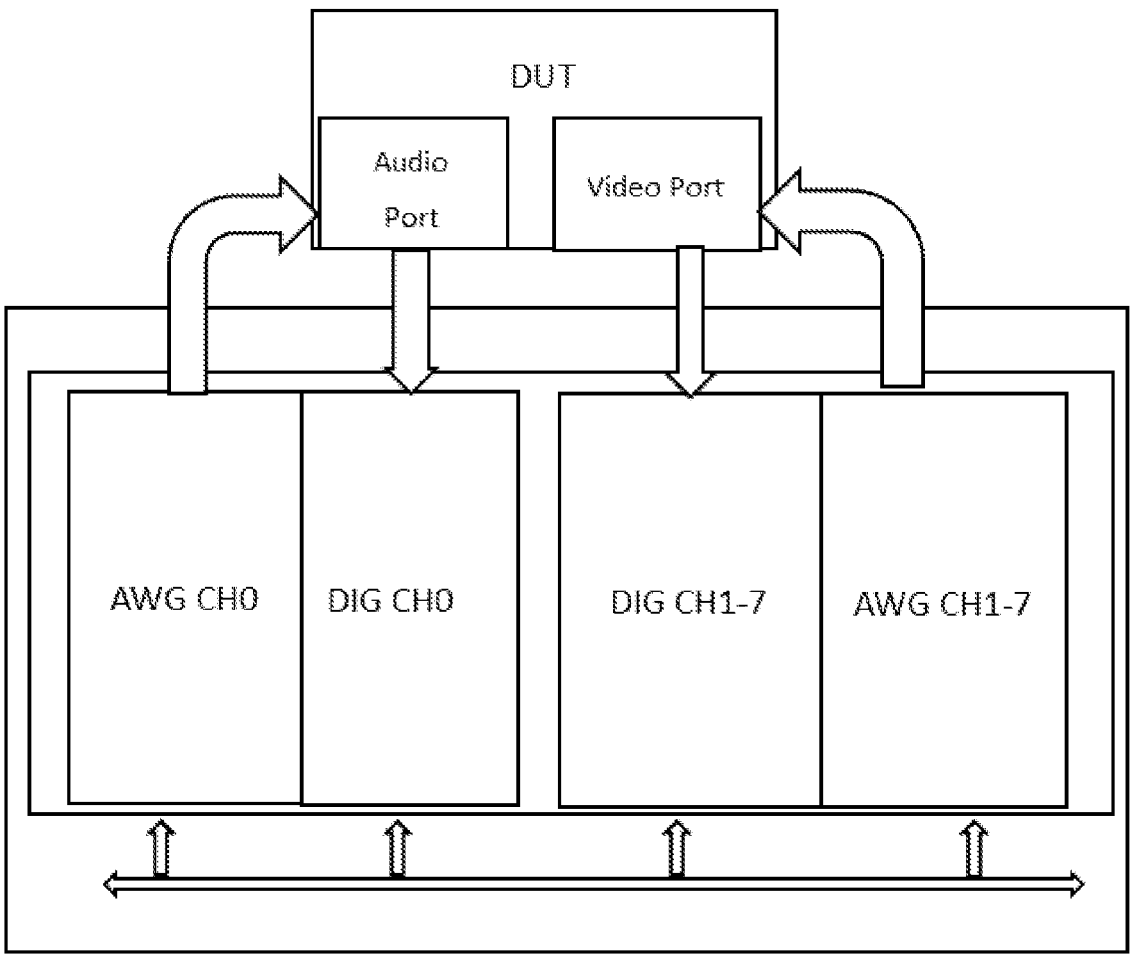
FIG. 2 is a schematic diagram of a test according to an embodiment of the present disclosure.

Implementation of an actual test on the DUT is as shown in FIG. 2. There are both Audio and Video functions in one DUT. Through an 8-channel AWG-DIG board, a group of channels AWG0 and DIG0 is configured to generate and measure Audios. In addition, the remaining channels AWG1 to AWG7 and DIG1 to DIG7 can be combined with high-speed and high-precision AWG and DIG required for testing Videos according to test needs.

The foregoing descriptions are preferable implementations of the present disclosure only. It is noted that a person of ordinary skill in the art may make some improvements and modifications without departing from the principle of the present disclosure and the improvements and modifications shall fall within the protection scope of the present disclosure.

What is claimed is:

1. An arbitrary signal generation and acquisition device with a multi-channel shared bandwidth, comprising: a synchronous data generator (1), a first direct digital synthesis (DDS) configurator (21), a second DDS configurator (22), first DDS generator (31), a second DDS generator (32), a digital-analog (DA) and multiplexer (MUX) controller (4), an analog-digital (AD) controller (5), a low-speed AD (6), a high-speed DA (7), an 8-to-1 multiplexer (8), a 1-to-8 multiplexer (9), an arbitrary waveform generator (AWG) channel (10), a digitalizer (DIG) channel (11), a data storage and data signal processor (DSP) (18), a 2-to-1 multiplexer (19), and a VREF reference voltage generator group (20), wherein the synchronous data generator (1), the first DDS configurator (21), the first DDS generator (31), the DA and MUX controller (4) are connected in sequence, and the synchronous data generator (1) is connected to the DA and MUX controller (4); the data storage and DSP (18), the second DDS configurator (22), the second DDS generator (32), and the AD controller (5) are connected in sequence; the AD controller (5) is connected to the data storage and DSP (18); the low-speed AD (6) is connected to the AD controller (5); the high-speed DA (7) is connected to the DA and MUX controller (4);

an inlet end of the 8-to-1 multiplexer (8) is connected to an outlet end of the DIG channel (11), and an outlet end of the 8-to-1 multiplexer (8) is connected to the low-speed AD (6);

an inlet end of the 2-to-1 multiplexer (19) is connected to the high-speed DA (7); an outlet end of the 2-to-1 multiplexer (19) is connected to an inlet end of the 1-to-8 multiplexer (9); an outlet end of the 1-to-8 multiplexer (9) is connected to an inlet end of the AWG channel (10);

the VREF reference voltage generator group (20) is respectively connected to the first DDS configurator (21) and the high-speed DA (7);

the synchronous data generator (1) is configured to generate DA data synchronized with DDS; the first DDS generator (31) is configured to generate a sampling frequency of AD/DA;

the first DDS configurator (21) is configured to set a reference voltage setting configured for DAs in the first DDS generator (31) and the VREF reference voltage generator group (20) in which the DAs need to be synchronized; or to set DDS generator configurations of a plurality of ADs that require staggered sampling;

the DA and MUX controller (4) is configured to send DA data to the DAs according to a DA triggering signal provided by a DDS, and send a DA conversion start signal; or, the 2-to-1 multiplexer (19) is controlled to select a DA signal or a level 0 according to a MUX triggering signal provided by the DDS, and the MUX triggering signal is sent to a specified channel;

the data storage and DSP (18) is configured to synchronously obtain an AD conversion result from the AD controller (5) according to a DDS synchronization signal, store the AD conversion result in a memory, and integrate multi-channel data in real time through the DSP;

the AD controller (5) is configured to send an AD conversion start signal according to the AD triggering signal provided by the DDS, read the AD conversion result, and hand the AD conversion result over to the data storage and DSP (18);

the 8-to-1 multiplexer (8) is configured to select one signal from DIZ input signals of at most eight channels and hand the signal over to the low-speed AD (6) for conversion;

the 2-to-1 multiplexer (19) is configured to select an output of the DA or an output of the level 0 to the 1-to-8 multiplexer (9) in the subsequent stage according to a MUX triggering signal of the DDS provided by the DA and MUX controller (4); and the 1-to-8 multiplexer (9) is configured to switch the output of the 2-to-1 multiplexer (19) in the previous stage to one of the 8 channels as required, and output the same to the AWG channel (10) of a front end.

2. The arbitrary signal generation and acquisition device with the multi-channel shared bandwidth according to claim 1, wherein the DIG channel (11) comprises a DIG channel fanout apparatus (12), a DIG channel filtering shifter (13), and a DIG channel input buffer (14); the inlet end of the 8-to-1 multiplexer (8) is respectively connected to outlet ends of the DIG channel fanout apparatus (12), the DIG channel filtering shifter (13), and the DIG channel input buffer (14); the AWG channel (10) comprises an adder (15), an AWG channel filtering shifter (16), and an AWG channel output buffer (17); and an outlet end of the 1-to-8 multiplexer (9) is connected to inlet ends of the adder (15), the AWG channel filtering shifter (16), and the AWG channel output buffer (17).

* * * * *